United States Patent [19]

Kinoshita et al.

[11] 4,350,867
[45] Sep. 21, 1982

[54] FUSION SPLICING OF MULTI-LAYER OPTICAL FIBER BUNDLES

[75] Inventors: Kyoichi Kinoshita; Morio Kobayashi, both of Mito, Japan

[73] Assignee: Nippon Telegraph & Telephone Public Corporation, Tokyo, Japan

[21] Appl. No.: 147,670

[22] Filed: May 7, 1980

[30] Foreign Application Priority Data

May 21, 1979 [JP] Japan .................................. 54-62467

[51] Int. Cl.³ ............................................. B23K 26/04
[52] U.S. Cl. ....................... 219/121 LC; 219/121 LD; 219/121 LQ; 219/121 LR; 219/121 LT; 219/121 LY; 219/158; 65/4.1
[58] Field of Search .................. 219/121 LC, 121 LD, 219/121 LP, 121 LQ, 121 LR, 121 LS, 121 LT, 121 LU, 121 LY, 121 L, 121 LM, 56, 56.1, 56.22, 57, 58, 158, 160; 65/4.1, 4.2, 4.21, 4.3, 4.4, 152; 228/6 R, 6 A, 178

[56] References Cited

U.S. PATENT DOCUMENTS

| | | | |
|---|---|---|---|
| 3,947,093 | 3/1976 | Goshima et al. | 219/121 LR X |
| 4,027,137 | 5/1977 | Liedtke | 219/121 LY X |
| 4,118,618 | 10/1978 | Gauthier et al. | 65/4.21 X |
| 4,121,087 | 10/1978 | Malmuth et al. | 219/121 LC X |
| 4,195,980 | 4/1980 | Sterling et al. | 219/121 LM X |
| 4,201,618 | 5/1980 | Lewis | 219/121 L X |
| 4,250,372 | 2/1981 | Tani | 219/121 LQ X |
| 4,263,495 | 4/1981 | Fujita et al. | 219/121 LC X |

FOREIGN PATENT DOCUMENTS

| | | | |
|---|---|---|---|
| 2147373 | 3/1972 | Fed. Rep. of Germany | 219/121 LM |
| 2360308 | 6/1974 | Fed. Rep. of Germany | 219/121 L |
| 2715443 | 10/1977 | Fed. Rep. of Germany | 65/4.2 |
| 2323646 | 4/1977 | France | 219/121 LC |
| 52-74197 | 6/1977 | Japan | 219/121 LR |
| 54-116799 | 9/1979 | Japan | 219/121 LT |

Primary Examiner—J. V. Truhe
Assistant Examiner—Keith E. George
Attorney, Agent, or Firm—Pollock, Vande Sande and Priddy

[57] ABSTRACT

First and second optical fiber groups, each composed of optical fibers in layers, are held by alignment mating means, with the optical fibers placed at predetermined positions and end faces of corresponding pairs of them butted with each other. A light beam emitted from a $CO_2$ laser is focused by a focusing optical system on the joints of the butted optical fibers. When the light beam is focused on one pair of butted optical fibers to fusion-splice them, the diameter of the focused light beam reaching the optical fibers adjacent to the irradiated ones is large so that their heating temperature by the focused light beam may not exceed their melting point. The focusing optical system and the alignment mating means are moved relative to each other to fusion-splice the butted optical fibers in succession.

17 Claims, 21 Drawing Figures

FUSION SPLICING OF MULTI-LAYER OPTICAL FIBER BUNDLES

BACKGROUND OF THE INVENTION

This invention relates to a method and apparatus for multifiber-splicing using light energy as a heat source.

Splicing of optical fibers is one of the important techniques for realization of optical communication systems. For permanent splicing of optical fibers, there have been proposed a method of joining the fibers using adhesive and a method of fusion-splicing the fibers by heating their butted end faces and fusing them together. The adhesive method allows ease both in single-fiber splicing and in multifiber-splicing of optical fibers arranged in array or in a matrix form but encounters a problem of unavoidable aging of adhesive, which leads to the defect of low reliability in long term use. The fusion-splicing method has advantages of low splice loss and little aging of the spliced part and hence is very feasible. As a fusing heat source for the fusion splicing method, use can be made of arc discharge, a $CO_2$ laser and so forth. The method utilizing arc discharge is not suitable for splicing optical fibers arranged in array nor is it applicable to splicing optical fibers arranged in a matrix form; therefore, in this method, fusion-splicing and subsequent reinforcement of spliced fibers require much time and furthermore there is a danger of an electrode material contaminating the spliced point. This method cannot be adopted in an environment in which arc discharge becomes unstable. Moreover, since the spliced points of the optical fibers are reinforced one by one, it is unavoidable that the spliced points become bulky by a reinforcing member. Therefore, this method does not fully satisfy the requirements for accurate and rapid splicing of optical fibers.

The use of the $CO_2$ laser as the heat source for fusion-splicing of optical fibers is disclosed, for example, in French Patent No. 2,323,646. Although this method is free from the drawbacks of the arc discharge method and is applicable to multifiber-splicing through utilization of the unidirectionality of a laser beam, all of the features of this method have not been utilized so far; this method has been used for a single-fiber splicing or splicing a plurality of optical fibers arranged in one plane or flat cables and is incapable of splicing a plurality of optical fibers placed in layers and has the defect that the required time for splicing is longer than that of the method using adhesive. With a method which requires separating such a multilayer optical fiber cable into individual fibers prior to splicing, an appreciably long extra length of each fiber is needed for splicing, so that the spliced point becomes bulky, resulting in the defect that the feature of the smallness of the optical fiber cable is lost.

An object of the present invention is to provide an optical fiber splicing method and apparatus which permit multifiber-splicing in a short time and with a short extra fiber length.

Another object of this invention is to provide an optical fiber splicing method and apparatus which permit marked reduction of the time for multifiber-splicing without impairing the high quality and high reliability of the fusion splicing method.

Another object of this invention is to provide a multifiber-splicing method and apparatus which ensure that only selected optical fibers can be fusion-spliced and optical fibers that are not being fusion-spliced are not affected by a light beam for fusion-splicing of the selected optical fiber.

Another object of this invention is to provide a multifiber-splicing method and apparatus which prevents excessive thickening of spliced points of optical fibers and permits easy reinforcement thereof.

Yet another object of this invention is to provide a multifiber-splicing method and apparatus which ensure accurate fiber splicing with a relatively small light beam output.

SUMMARY OF THE INVENTION

According to the present invention, first and second optical fiber groups, each composed of a plurality of optical fibers arranged in layers, are respectively held by first and second alignment holders in such a manner that the optical fibers of each group are placed in predetermined positions and in parallel relation, with their ends projecting out from one side of each of the first and second alignment holders. The first and second alignment holders hold the optical fibers in the same positional relation. The corresponding ones of the optical fibers of the two groups to be spliced in pairs are aligned and their end faces are butted together by mating means. The first and second alignment holders and the mating means can also be formed as one alignment mating holder.

Such an arrangement is made that the optical fibers of at least one of the first and second fiber groups held by the first and second alignment holders may be fine-controlled in the fiber-axis direction with respect to the positions of the end faces of the optical fibers of the other group. Further, the end faces of the optical fibers of the first and second fiber groups are butted together with a predetermined butting pressure by utilizing the positional fine control means.

A light source, for example, a $CO_2$ laser light source, is provided for emitting a light beam which is absorbed by the optical fibers to heat them. The light beam is focused by a focusing optical system to the butted joint of the optical fibers to be fused together. This focused light beam is directed to one butted fiber joint or two vertically adjoining butted fiber joints. In this case, the beam spot to butted fiber joints which are not being fusion-spliced is made larger in diameter than the beam spot to the other butted fiber joint for being fusion-spliced so that the temperature of the former butted joints heated by the beam may not exceed their melting point. In other words, the center-to-center distance between the optical fibers of adjacent layers is about 1 to 5 mm, and the diameter of the beam spot to the butted fibers to be fused together is so selected as to provide sufficient light energy density for fusion-splicing, but the diameter of the beam spot to the butted fibers of the other layer spaced about 1 mm apart from the butted fibers to be fused together is made large to such an extent that the fibers of the abovesaid other layer may not be fused by the light beam. Further, for fusion-splicing of low loss and good reproducibility, the diameter of the light beam to the butted fibers to be fused together is selected about five to ten times the fiber diameter. As the focusing optical system for such purpose, use is made of an aspherical focusing lens of large aberration, a combination of a conical lens and a meniscus lens or an optical system including reflectors for splitting a light beam into two and combining the split lights into a composite light beam by using two different focus positions.

The first and second optical fiber groups mated and held as described previously and the optical system are moved relative to each other in a direction perpendicular to the fiber axis, by which the butted joints of the optical fibers to be exposed to a focused light beam are sequentially selected for fusion splicing. In this case, after one butted fiber layer to be fused is selected, the optical fibers of the selected layer are fusion-spliced one after another. Next, the focused light beam position is shifted to the adjoining fiber layer in a direction perpendicular to the direction of relative movement and the optical fibers of the adjoining fiber layer are sequentially spliced. It is preferred that the optical fibers to be spliced are gradually heated and cooled. To this end, for example, in the case of fusion-splicing of the optical fibers of one fiber layer, the focused light beam is continuously moved across the butted fiber joint. In this case, it is desirable that the beam moving speed is selected constant in the range of 10 to 25 $\mu m/s$ when the focused light beam is moving on one optical fiber. For reducing the time for splicing operation, while the focused light beam is moving between optical fibers, the moving speed of the beam can be made higher than the speed in the case of the beam moving across the optical fiber.

DESCRIPTION OF THE PREFERRED EMBODIMENTS

Figure 1:
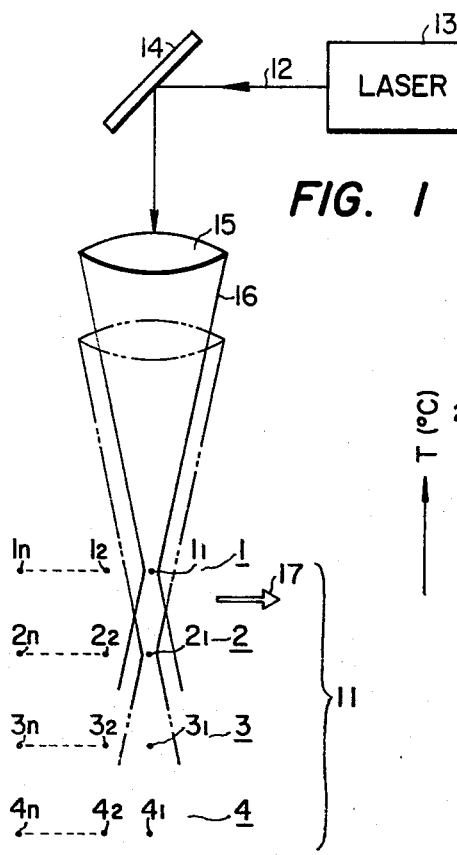
FIG. 1 is a schematic diagram of the principles by which optical fibers arranged in layers are fusion-spliced for each layer.

A description will first be given, with reference to FIG. 1, of the principles of the present invention. In FIG. 1, a group of optical fibers, which are shown in cross section to extend perpendicularly to the sheet, are indicated generally by 11. The optical fiber group 11 includes first to fourth layers 1 to 4 respectively composed of optical fibers $1_1$ to $1_n$, $2_1$ to $2_n$, $3_1$ to $3_n$ and $4_1$ to $4_n$, the optical fibers of each layer being arranged side by side in a horizontal direction. The optical fibers of each layer are equally spaced apart and the corresponding optical fibers of the layers 1 to 4 are respectively positioned on the same vertical lines. The optical fiber group 11 is exposed to light beam irradiation; namely, a light beam 12 which generates heat when absorbed by the optical fibers of the optical fiber group 11 is emitted from a light source 13. The light source 13 is, for example, a $CO_2$ laser, from which a light beam 12 is emitted, for example, in a horizontal direction and then reflected by a reflector 14 down in a vertical direction. The reflected light beam 12 is focused by a focusing optical system 15; in this case, when the optical system 15 lies at the solid line position, the optical beam 12 is focused most intensely, as indicated by 16, at the position of the uppermost optical fiber layer, that is, the first layer 1 to irradiate its optical fiber $1_1$. When the end face of the optical fiber $1_1$ is contacted with the end face of its counterpart at the position of the focused light beam spot, the butted optical fiber ends are heated by the focused light beam 16 and fused together. In this case, the focused light beam 16 also irradiates the optical fibers $2_1$, $3_1$ and $4_1$ underlying the optical fiber $1_1$ but since the convergence of the focused light beam 16 is low at these positions, the optical fibers $2_1$, $3_1$ and $4_1$ are not fused. By moving the optical fiber group 11 in a lateral direction as indicated by the arrow 17 while holding the optical fibers in the abovesaid state, the optical fibers $1_2$ to $1_n$ successively pass through the position where the light beam 16 is most focused, resulting in the n optical fibers $1_1$ to $1_n$ of the uppermost layer being fusion-spliced with their counterparts one after another. Next, the focusing optical system 15 is brought down to the broken line position so that the light beam 16 is most focused on the optical fiber $2_1$ to fusion-splice it with its counterpart. In this case, since the focused light beam 16 on the optical fiber $1_1$ overlying the optical fiber $2_1$ is larger in diameter and hence lower in light energy density than on the optical fiber $2_1$, the optical fiber $1_1$ is not fused, and the energy of the light beam 16 which is absorbed by the optical fiber $1_1$ is essentially negligible; therefore, fusion-splicing of the optical fiber $2_1$ with its counterpart can be carried out. The optical fibers $3_1$ and $4_1$ are also irradiated by the focused light beam 16 but are not fused since the light beam 16 is low in convergence degree and low in energy density at those positions. In the manner described above, the optical fibers of each layer can selectively be fusion-spliced with their counterparts one after another.

Figure 2:
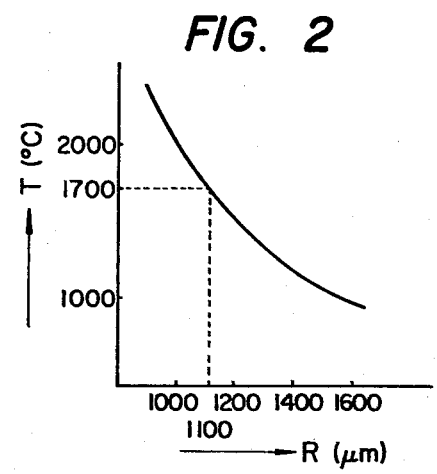
FIG. 2 is a graph showing the relationships between the focused light beam diameter and the maximum heating temperature at the position of an optical fiber disposed just above an optical fiber being fusion-spliced.

FIG. 2 shows the results of calculation of the highest temperature T of the optical fiber $1_1$ with respect to the diameter R of the focused light beam 16 at the position of the optical fiber $1_1$ with a 150 μm outer diameter in the case where when the focusing optical system 15 is disposed at the broken line position in FIG. 1 and the diameter of the focused beam 16 at the fusion-splicing position, that is, at the position of the optical fiber $2_1$ is 800 μm, the optical fiber $2_1$ is fusion-spliced at 2000° C. at the highest by moving the focused light beam 16 and the optical fiber $2_1$ relative to each other at a speed of 15 μm/s. In FIG. 2, the abscissa represents the diameter of the focussed light beam 16 on the optical fiber $1_1$ and the ordinate the temperature of the optical fiber $1_1$. An optical fiber whose main component is silica has a melting point in the range of 1700° to 2000° C. and the temperature of the optical fiber $1_1$ other than the optical fiber $2_1$ to be fusion-spliced is sufficient to be lower than the abovesaid melting point; it is seen from FIG. 2 that when the optical fiber $1_1$ is at 1700° C., the diameter of the focused light beam 16 on the optical fiber $1_1$ is 1100 μm. Accordingly, it is sufficient that the diameter of the focused light beam 16 on the optical fiber $1_1$ is larger than 1100 μm. In other words, it suffices that the diameter of the focused light beam 16 at the position of the adjoining optical fiber $1_1$ is 1.4 times larger than the 800 μm diameter of the focused light beam 16 at the fusion splicing position, that is, at the position of the optical fiber $2_1$. This condition is required in the worst case in which the corresponding optical fibers of the fiber layers 1 and 2 are respectively disposed on the same vertical lines. In the case where the corresponding optical fibers do not lie on the same vertical lines, the optical fiber $2_1$ is fusion-spliced at a place where the center of the focused light beam 16 is away from the optical fiber $1_1$ and the light energy absorbed by the optical fiber $1_1$ is small; consequently, the diameter of the light beam passing through the upper optical fiber layer 1 may be about 1.1 times larger than the diameter of the focused light beam on the optical fiber $2_1$. By focusing the optical beam to satisfy such a requirement, only a selected one of the optical fiber can be fusion-spliced and the other optical fibers are not affected by the passage therethrough of the focused light beam.

Figure 3:
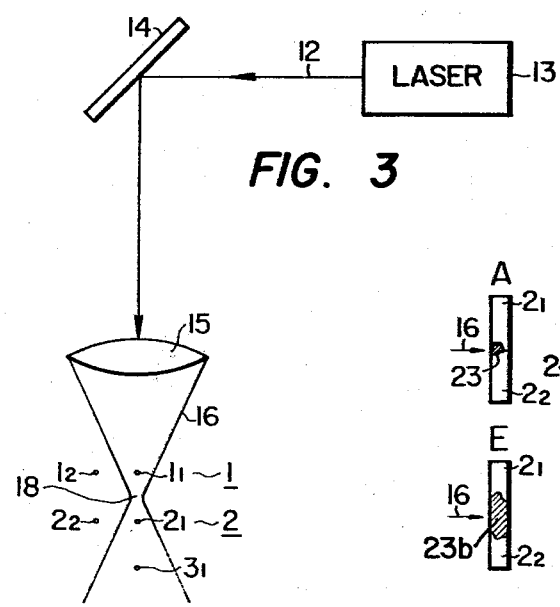
FIG. 3 is a diagram illustrating the principles by which optical fibers of two layers are simultaneously fusion-spliced.

It is also possible to perform simultaneous fusion splicing of optical fibers of two fiber layers. For example, as shown in FIG. 3 in which parts corresponding to those in FIG. 1 are identified by the same reference numerals, the smallest diameter portion 18 of the focused light beam 16 is positioned midway between the adjoining optical fiber layers 1 and 2. In this case, the spot diameter of the focused light beam 16, for example, on the optical fibers $1_1$ and $2_1$ of the both layers 1 and 2 is suitable for fusion splicing of the optical fibers $1_1$ and $2_1$ but the diameter of the focused light beam on the other remaining optical fiber $3_1$ is enlarged so that the heating temperature by the light energy absorbed by the optical fiber $3_1$ may be lower than its melting point. In this way, the optical fibers $1_1$ and $2_1$ can be fusion-spliced at the same time.

Figure 4:
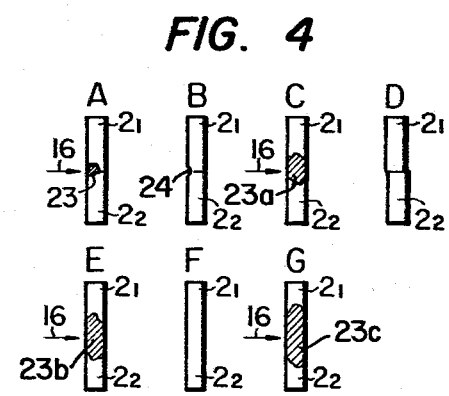
FIGS. 4A, 4C, 4E and 4G are respectively sketches from photographs of the states of optical fibers being heated by focused light beams of various diameters.
FIGS. 4B and 4F are sketches from photographs, respectively corresponding to FIGS. 4A and 4E, of spliced parts after fusion-splicing.
FIG. 4D is a sketch from a photograph, corresponding to FIG. 4E, of the two butted optical fibers before fusion-splicing.

It is preferred that the light beam diameter at the position of the optical fiber to be fusion-spliced is about 5 to 10 times larger than the outer diameter of the optical fiber. In the case where an optical fiber 21 with a 150 μm diameter is irradiated by a light beam output of 0.5 W 16 in a direction perpendicular to the fiber axis, as shown in FIG. 4A, when the diameter of the optical beam at the position of the optical fiber 21 is 194 μm, the butted end faces of optical fibers 21 and 22 are heated on the side facing the light beam 16 to shine as indicated by 23 in FIG. 4A which is a sketch from a photograph showing the shining of the heated part at the butt joint, but the other side is not sufficiently heated. That is, the butted end faces are fused together only at one part and a depression 24 is produced at the joint of the optical fibers on the side of the incidence thereto of the light beam 16 to reduce the fiber diameter, as depicted in FIG. 4B. However, by selecting the diameter of the light beam 16 to be 680 μm, about five times larger than the outer diameter of the optical fibers 21 and 22, their light beam irradiated portion shines not only on the side of incidence of the light beam but also on the opposite side, as indicated by 23a in FIG. 4C, and the two optical fibers 21 and 22 are fused together over the entire area of their end faces. When the diameter of the light beam 16 is 1066 μm, that is, about seven times as large as the diameter of the optical fiber, even if there is a slight fiber axis deviation between the optical fibers 21 and 22 as shown in FIG. 4D, the optical fibers 21 and 22 shine over the entire area of their butt joint as indicated by 23b in FIG. 4E and are fused together. In this case, the shining part 23b is larger in the axial direction of the fibers than in the case of FIG. 4C and this part is softened and the optical fibers 21 and 22 are subjected to a correcting force by surface tension during the fusion splicing, with the result that the abovesaid fiber axis deviation is removed as shown in FIG. 4F. When the diameter of the light beam 16 is selected to be 1412 μm, that is, about 9 times as large as the outer diameter of the optical fiber, the shining part 23G at the butt joint of the optical fibers 21 and 22 becomes larger in the axisl direction thereof, as depicted in FIG. 4G. Accordingly, if the diameter of the light beam is selected too large, the portion to be softened becomes so large that the spliced optical fibers are likely to be curved. In view of this, it is preferred that the diameter of the light beam be in the range of 5 to 10 times the outer diameter of the optical fiber.

Figure 5:
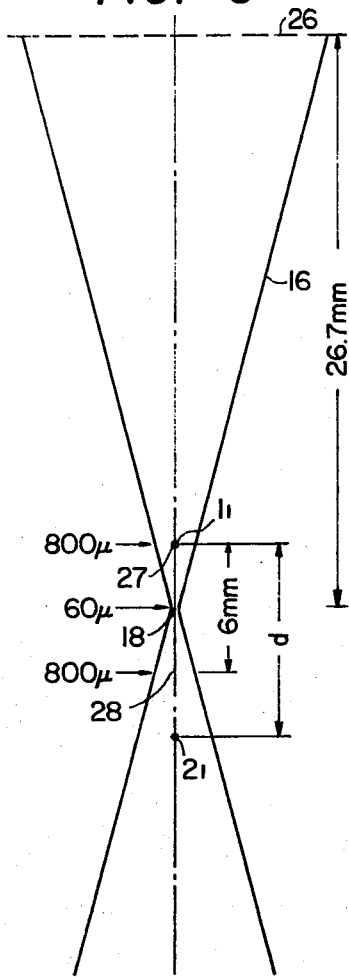
FIG. 5 is a diagram showing the relationship between the focused light beam diameter by an ordinary meniscus lens and the optical fibers arranged in layers.

Next, a description will be given of the focusing optical system 15 employed in FIG. 1. FIG. 5 shows focusing of the light beam 16 by a conventional meniscus lens with a focal length f=26.1 mm, placed at a distance of 1 mm from a laser beam source. A broken line 26 indicates the position where the lens is disposed. The minimum spot diameter of the light beam 16 is about 60 μm which is too small to fusion-splice optical fibers at this position 18. The distance between positions 27 and 28, where the diameter of the light beam is 800 μm which is approximately five times as large as the outer diameter (150 μm) of the optical fiber, is 6 mm. In the case where the optical fiber $1_1$ is placed at the one position 27 for fusion splicing, another optical fiber, if placed at the other position 28 or near the optical fiber $1_1$, would be fused too much and broken during the fusion splicing of the optical fiber $1_1$. Accordingly, optical fibers cannot be fusion-spliced individually for each optical fiber layer unless the distance d between the optical fiber $1_1$ to be fusion-spliced and the other optical fiber $2_1$, that is, between adjacent optical fiber layers, is selected to be more than 6 mm. In this case, considering the thicknesses of a focusing optical system holder and optical fiber alignment units in the direction in which the optical fiber layers are placed one above another, only two or three optical fiber layers can be arranged but such a small number of layers has little significance of the matrix arrangement of optical fibers. A longer focal length of the focusing lens increases the focal depth and requires enlargement of the abovesaid distance d, which is more disadvantageous. The widening of the distance d also leads to bulking of the spliced portion of optical fibers fused together and hence is undesirable. From this point of view, the distance d is preferably 5 mm or less. In contrast thereto, a shorter focal length of the focusing lens is advantageous in the reduction of the focal depth but, in this case, the distance between the focusing lens and the position of focus is so short that many layers of optical fibers cannot be disposed. Since the optical fibers are each coated with a plastic material, the distance d between adjacent layers of fibers cannot be made smaller than 0.7 mm in general.

Figure 6:
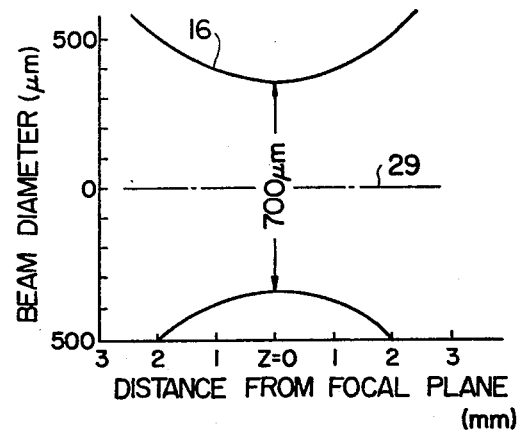
FIG. 6 is a diagram showing the light beam diameter in the vicinity of focus when focused by an aspherical focusing lens of large aberration.
Figure 7:
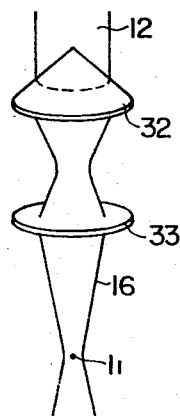
FIG. 7 is a diagram showing the relationship between a focused light beam and the optical fibers arranged in layers in a device actually used.

As the focusing optical system 15 which permits the reduction of the distance d, use can be made of an aspheric focusing lens which is large in aberration and small in the depth of focus. This lens is so designed as to focus, for example, a laser beam with a diameter of 20 mm into a minimum spot diameter of 1 mm, and the focal length is 30 mm. FIG. 6 shows measured values of the beam diameter in the case where such a focusing optical system 15 was actually built in an optical fiber splicing equipment. In FIG. 6, the abscissa represents the distance from the focal position, the ordinate represents the beam diameter and the broken line 29 shows the center line of the light beam 16. Due to fabrication error, the minimum beam diameter was about 1700 $\mu$m which is a little smaller for optimum fusion splicing of the optical fiber. Then, optical fibers were fusion-spliced for each layer at the position of about 800 $\mu$m beam diameter spaced a little apart from the focus position 18, is depicted in FIG. 7 in which the optical fiber $1_1$ is shown to be placed at the fusion-splicing position. The lens surface of an aspheric lens 31 used as the focusing optical system 15 is deviated from the spherical surface of the lens so that its aberration may be large. In this way, optical fibers of a multi-layer arrangement in which the distance d is 3 mm can be fusion-spliced for each layer. Experiments were also conducted on the method of simultaneous fusion splicing of optical fibers of two layers, referred to previously with regard to FIG. 3, using the aspheric lens 31. In the experiments, the distance d was 1 mm and the fusion splicing was carried out at a place where the beam diameter was about 720 $\mu$m.

Figure 8:
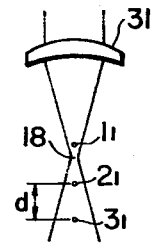
FIG. 8 is a diagram illustrating an example of the focusing optical system employing a conical lens and a meniscus lens.
Figure 9:
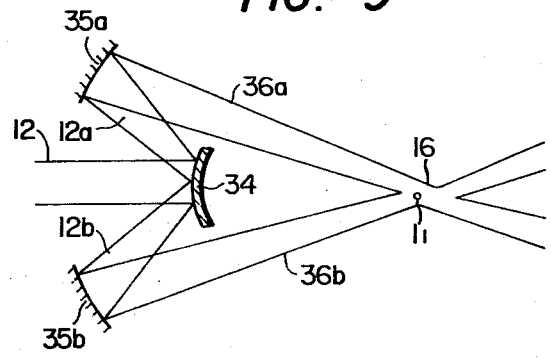
FIG. 9 is a diagram illustrating another example of the focusing optical system employing reflectors.

Such a focusing optical system 15 need not always be limited specifically to the aspheric lens but may also be an optical system such, for example, as shown in FIG. 8. In FIG. 8, the light beam 12 passes through a conical lens 32 and is focussed by a focusing lens 33, such as a meniscus lens, into a focused light beam 16 to irradiate an optical fiber. Also, it is possible to constitute the focusing optical system 15 using reflectors instead of the lenses. For example, as shown in FIG. 9, the light beam 12 is split by splitting means, for instance, a reflector 34, into two beams 12a and 12b, which are then focused into a composite beam. That is, the light beam 12a and 12b are respectively reflected by concave reflectors 35a and 35b and the reflected lights 36a and 36b are combined into a focused light beam 16. In such a case, the focal positions of the reflectors 35a and 35b are deviated from each other, by which the beam diameter at the position of fusion-splicing an optical fiber is made 5 to 10 times larger than the outer diameter of the optical fiber and the beam diameter at the position of an optical fiber adjacent the abovesaid one is sufficiently enlarged.

Figure 10:
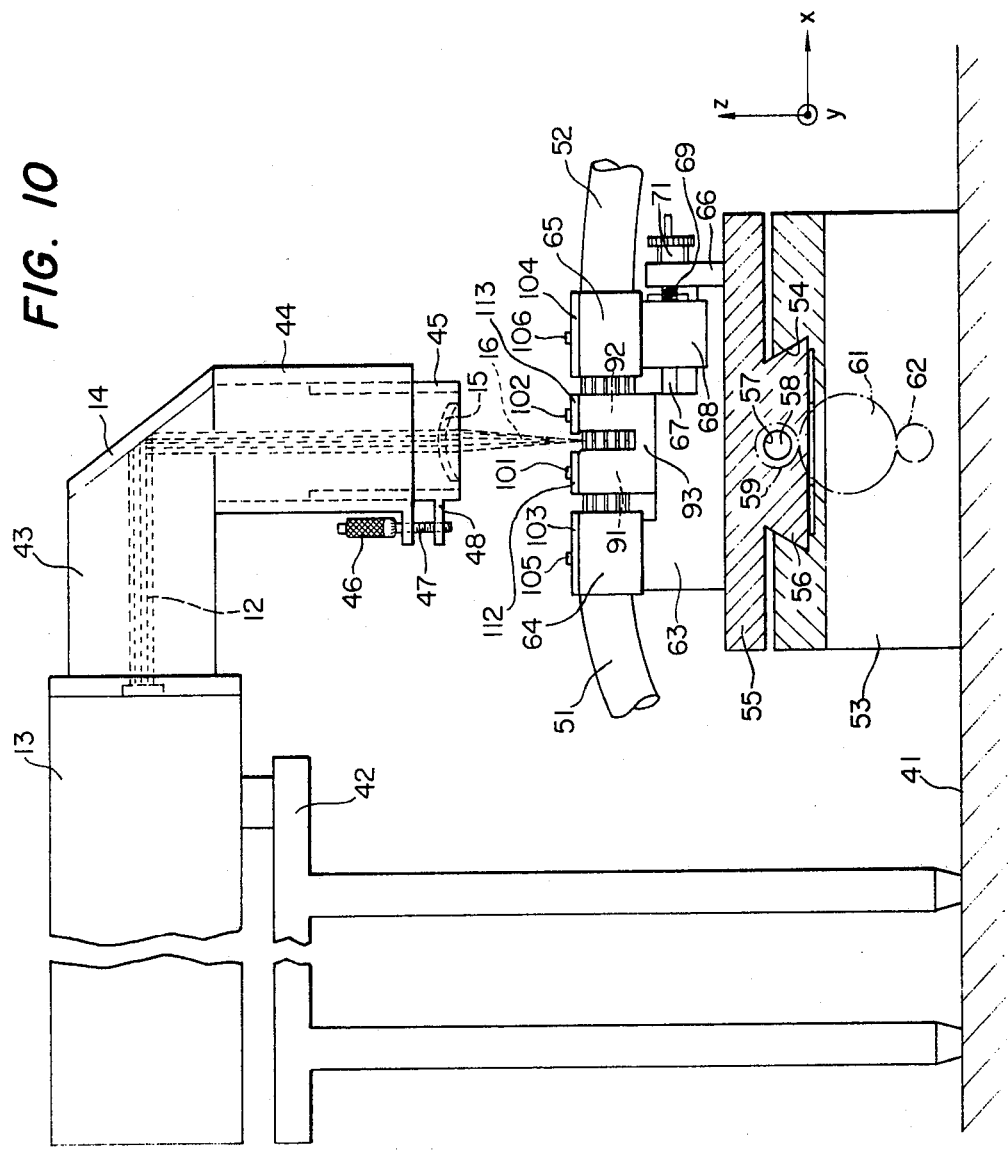
FIG. 10 is a front view illustrating an example of the optical fiber splicing apparatus of this invention.
Figure 11:
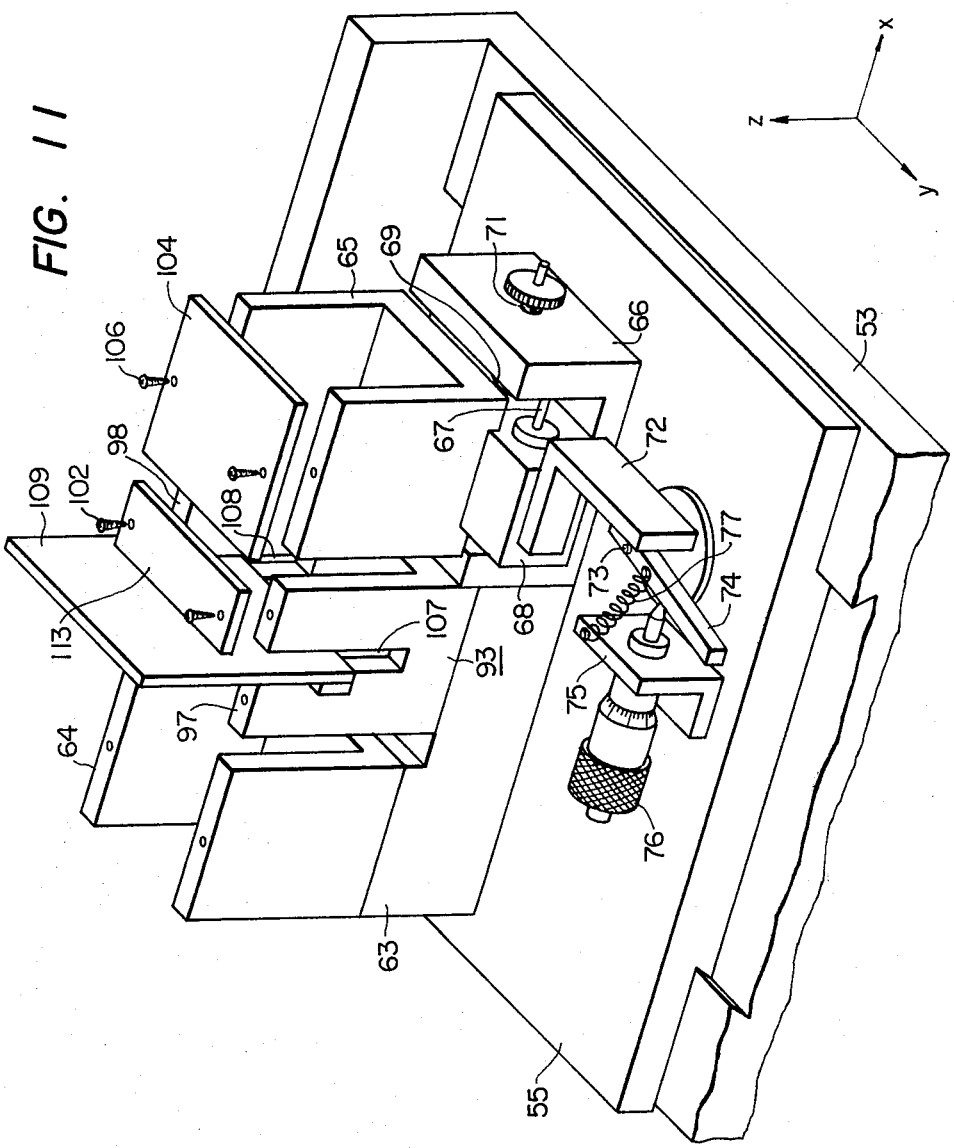
FIG. 11 is a perspective view showing an alignment holder used in the apparatus of FIG. 10.

Referring next to FIGS. 10 and 11, a description will be given of an embodiment of the optical fiber splicing apparatus of the present invention. On a base 41 is fixedly mounted a support 42, on which a $CO_2$ laser 13 is mounted. A laser beam 12 is emitted from the laser 13 in a horizontal direction, that is, in the X-axis direction in FIG. 10. A support arm 43 which surrounds the laser beam 12 is fixed at one end to the body of the laser 13 on the side of laser beam emission. To the other end of the support arm 43 is attached a reflector 14 at an angle of approximately 45° to the laser beam 12, by which reflector the laser beam 12 is reflected down towards the base 41. A bodytube 44 is attached to the support arm 43 in a manner to surround the laser beam 12 directed from the reflector 14 towards the base 41. To the lower end of the bodytube 44 is attached a focusing optical system 15. The focusing optical system 15 is designed so that its position on the axis of the bodytube can be adjusted. To this end, a movable tubular member 45 is fitted into the bodytube 44 and the focusing optical system 15 is mounted in the movable tubular member 45. On the outer peripheral surface of the bodytube 44 at the end portion on the side of the base 41 a micrometer 46 is mounted in parallel with the axis of the bodytube 44. A pin 47 of the micrometer 46 is threaded and screwed into a tapped hole of a projecting piece 48 which extends laterally from the movable tubular member 45 outwardly of the bodytube 44. Accordingly, by rotating the micrometer 46, the movable tubular member 45 is moved up or down along its axis, that is, in the Z-axis direction of FIG. 10.

On the side to which the focused laser beam 16 is projected from the movable tubular member 45 there are disposed ends of optical fibers of first and second fiber groups. In the present embodiment, the first and second optical fiber groups are shown to be optical fiber cables 51 and 52, which are held in a manner to be movable in the Y-axis direction, that is, in a direction perpendicular to both of their fiber axis, that is, the X-axis, and the focused laser beam 16, that is, the Z-axis. To this end, a rail holder 53 is fixedly mounted on the base 41; a groove 54 is formed in the rail holder 53; a moving base plate 55 is disposed on the rail holder 53; and an engaging member 56 provided on the moving base plate 55 is fitted into the groove 54 so that the moving base plate 55 may be moved along the groove 54 in the Y-axis direction. A tapped hole 57 is formed in the engaging member 56 to extend in its direction of movement. A screw shaft 58 is screwed into the tapped hole 57 and provided at one end with a gear 59 which meshes with a gear 61, which, in turn, meshes with a gear 62. The gear 62 is affixed to the shaft of a motor (not shown) which is housed in one end portion of the rail holder 53. Accordingly, by driving this motor, the moving base plate 55 is moved along the groove 54.

A holder 62 is fixed on the moving base plate 55 and, on the holder 62, cable retainers 64 and 65 are mounted on both sides of the groove 54. The one cable retainer 65 is adapted to be movable in parallel with the fiber axis, that is, in the X-axis direction while holding the optical fiber cable 52. That is, the portion of the holder 63 on the side of the cable retainer 65 is made lower than the side of the cable retainer 64 and a support plate 66 is planted on the moving base plate 55 in opposing relation to the holder 63. Two guide shafts 67, which are parallel with the X-axis, are bridged between the support plate 66 and the holder 63. The base portion 68 of the cable presser 65 is mounted on the guide shafts 67 which are inserted thereinto. Between the base portion 68 and the support plate 66 is stretched a coiled spring 69, by which the cable retainer 65 is biased towards the cable retainer 64. In this example, the biasing force of the coiled spring 69 is adjustable. A tapped hole is formed in the support plate 66 to extend therethrough and a threaded tube 71 is screwed into the tapped hole. The end face of the threaded tube 71 on the opposite side from the cable retainer 64 is closed and one portion of the coiled spring 69 enters into the threaded tube 71 to butt against the end plate. Accordingly, by turning the threaded tube 71, the biasing force imparted by the coiled spring 69 to the base portion 68 is varied.

Projecting out from the base portion 68 perpendicularly to the guide shaft 67 is an arm 72. A lever 74 is rotatably mounted on a shaft 73 (see FIG. 11) planted on the moving base plate 55 and one end of the lever 74 engages with the arm 72 on the side of the cable retainer 64 to limit movement of the base portion 68. An L-shaped metal member 75 is fixed to the moving base plate 55 in opposing relation to the side of the lever 74 opposite from the arm 72. Between the L-shaped metal member 75 and the lever 74 is stretched a coiled spring 77, by which the lever 74 is pulled into contact with the end face of the shaft of a micrometer 76. By adjusting the micrometer 76, the position of the lever 74 on the side of the base portion 68 is adjusted to move the base portion 68 to that position.

The optical fibers in the optical fiber cables 51 and 52 respectively held by the cable retainers 64 and 65 are arranged as shown in FIG. 1 and aligned so that the axes of the optical fibers to be fused together may coincide with each other. Coatings of one end portion of each of the optical fiber cables 51 and 52 are removed and their optical fibers are held by alignment holders 91 and 92 so that they are positioned in predetermined relationships and that their axes are parallel. The alignment holders 91 and 92 are disposed in an alignment jig 93 and the corresponding optical fibers to be fused together are arranged in alignment.

Figure 12:
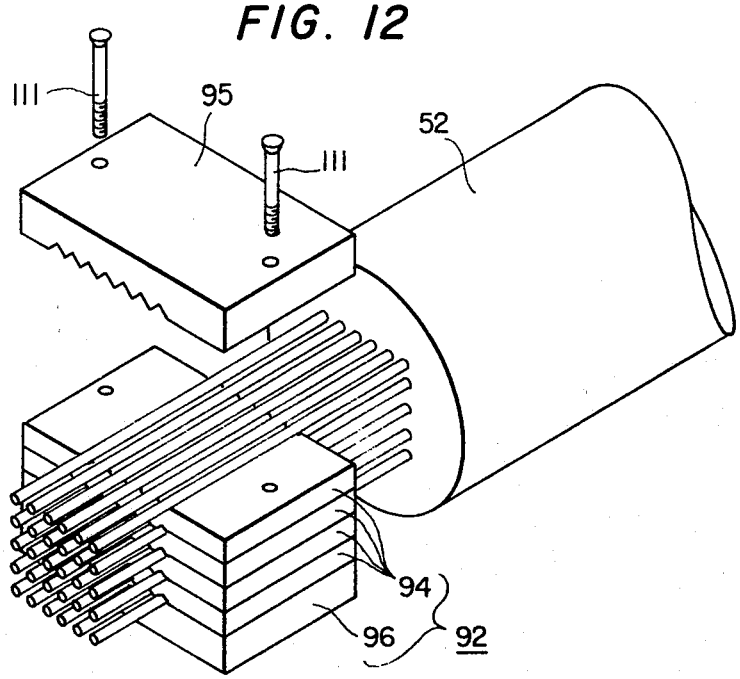
FIG. 12 is a perspective view showing an example of an alignment holder.

Since the alignment holders 91 and 92 are identical in construction with each other, an example of the alignment holder 92 is illustrated in FIG. 12. Alignment chips 94, each having V-shaped grooves formed in its both sides, are each interposed between adjacent ones of the optical fiber layers, with optical fibers respectively held in the grooves; hence, the layer spacing is determined by the thickness of each alignment chip 94. The optical fibers of the uppermost and lowermost layers, held by the alignment chips 94, are clamped by alignment chips 95 and 96 from above and below. These alignment chips 95 and 96 also have V-shaped grooves in their inner side. The alignment chips 94 to 96 are clamped together by means of screws 111.

The alignment jig 93 is placed between the cable retainers 64 and 65. A pair of opposing positioning plates 97 and 98 are planted on the holder 63 in parallel with the X-axis and the bottoms of the positioning plates 97 and 98 are flush with each other. The distance between the positioning plates 97 and 98 is substantially the same as the distance between both sides of the alignment chips 94. The optical fiber groups held by the alignment holders 91 and 92 are respectively placed between the positioning plates 97 and 98 and each pair of optical fibers to be fused together are aligned. In this state, the alignment holders 91 and 92 are fixed by clamping fixing plates 112, and 113, disposed on the uppermost chips 95, to the upper end faces of the positioning plates 97 and 98 by means of screws 101 and 102.

Each of the cable retainers 64 and 65 is, for example, a frame-like member having a U-shaped cross-section. The cables 51 and 52 having coatings are respectively placed in the cable retainers 64 and 65 and covered with keep plates 103 and 104 and then fixed in the cable retainers 64 and 65 by clamping the keep plates 103 and 104 using, for example, screws 105 and 106. If necessary, vertical grooves 107 and 108 parallel with the Z-axis are respectively cut in the positioning plates 97 and 98 substantially centrally thereof in the X-axis direction. A partition plate 109 is fitted into the vertical grooves 107 and 108 across the positioning plates 97 and 98 and the end faces of the optical fibers of the cable 51 are contacted with the partition plate 109. Then, the partition plate 109 is removed and the end faces of the optical fibers of the cable 52 are butted against the end faces of the optical fibers of the cable 51. In this state, the cable 52 is fixedly held by the keep plate 104 in the cable retainer 65. The screws 102 for the fixing plate 113 are loosened in advance and the lever 74 is turned counterclockwise in FIG. 11 by adjusting the micrometer 76 to push the optical fiber cable 52 by the coiled spring 69 about 5 to 10 μm towards the optical fiber cable 51, providing a butting pressure between the butted pairs of optical fibers. Thereafter, the screws 102 are tightened. The holder 63 and the bodytube 44 are positioned beforehand so that the focused laser beam 16 may be incident to the joint of the butted optical fibers perpendicularly to their axis.

After the optical fiber cables 51 and 52 are mounted in the cable retainers and their corresponding optical fibers are butted together with the butting pressure as described above, the focused spot of the laser beam 16 is brought by adjustment of the micrometer 46, for example, to the position of the first optical fiber layer and the moving base plate 55 is moved in the Y-axis direction; then, the optical fibers of the first layer are fusion-spliced. At this time, since the focused laser beam 16 is in such a focused state as described previously in connection with FIG. 1, the optical fibers of the other layers are not affected by the laser beam. After fusing of the optical fibers of the first layer, the micrometer 46 is adjusted to bring the focal position of the focused laser beam down to the position of the second optical fiber layer and the moving base plate 55 is shifted and then the optical fibers of the second layer are fused. Thereafter, fusion splicing of the optical fibers of the other layers is similarly carried out.

For gradually heating and cooling the optical fibers in the fusion splicing, at least the focused laser beam 16 is continuously moved relative to the optical fibers. A method that has been employed so far is to set the butted ends of the optical fibers at the center of a laser beam and to open and close a shutter for intermittently applying the laser beam to the optical fibers to be fused together. With this method, however, since the optical fibers are quickly heated and cooled, bubbling is liable to occur and dispersion in splice loss is large. But, since the power distribution of the laser beam is a Gaussian distribution, the optical fibers to be fused together are gradually heated and cooled by moving the focused laser beam 16 relative to the optical fibers; consequently, bubbling is prevented and splicing of good reproducibility can be achieved. It is proper that the moving speed of the optical fibers during splicing is 10 to 25 $\mu$m/s. With moving speeds lower than 10 $\mu$m/s, no influence is exerted on the characteristic of the spliced optical fibers but the time for splicing becomes longer.

The outer diameter of an optical fiber, including its plastic coating, is approximately 1 mm and the total width of an array of eight optical fibers arranged side by side is about 8 mm. Thirteen minutes or more are needed for moving the moving base plate 55 over the abovesaid distance at the speed of 10 $\mu$m/s; this is not efficient. In practice, the time for splicing is reduced in the following manner. Namely, when the laser beam is on a pair of butted fibers to be spliced, the base plate 55 carrying the fiber array is driven at a speed of 15 $\mu$m/s by a distance twice the outer diameter of the optical fiber, whereas, when the laser beam is between the optical fibers, the base plate 55 is driven at a higher speed of about 2 mm/s. By this method, the time for fusion-splicing the array of eight optical fibers is reduced to a little shorter than three minutes.

Figure 21:
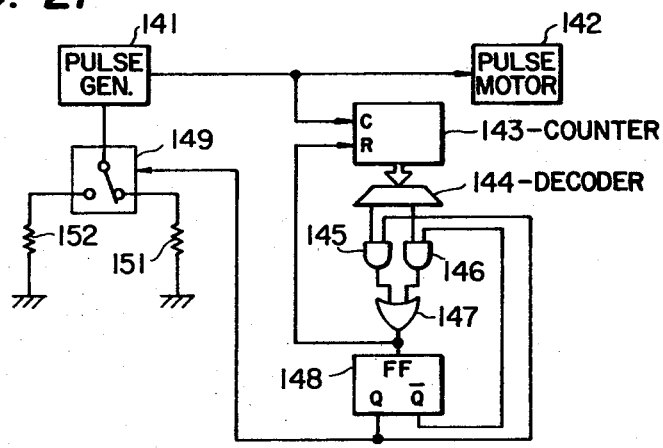
FIG. 21 is a circuit diagram of a control device for controlling the speed of a motor for driving a moving base plate.

For this speed control, use can be made of a control device such, for example, as shown in FIG. 21. In FIG. 21, a pulse generator 141 is provided for generating pulses of a frequency corresponding to a voltage applied, and the output pulses of the pulse generator 141 are applied to a pulse motor 142 to drive it. The motor 142 drives the shaft of the gear 62, shown in FIG. 10, by which the moving base plate 55 is moved in the Y-axis direction. The output pulses of the pulse generator 141 are counted by a counter 143, whose count content is decoded by a decoder 144. The count contents of the counter 143 in the cases where the moving base plate 55 has been moved a distance twice the diameter of each optical fiber and where the moving base plate 55 has been moved a distance that the distance twice the fiber diameter is subtracted from the center-to-center distance of the optical fibers, are detected by the decoder 144 and these detected outputs are respectively provided to gates 145 and 146. The outputs from the gates 145 and 146 are applied via an OR gate 147 to a toggle flip-flop 148 to control it for inversion. At the same time, the output from the OR gate 147 is provided to the counter 143 to reset it. The outputs Q and $\overline{Q}$ of the flip-flop 148 are respectively applied as control signals to the gates 145 and 146. Further, by the output Q of the flip-flop 148, a switch 149 is controlled to switch resistors 151 and 152 to the pulse generator 141.

In the initial state, the output $\overline{Q}$ of the flip-flop 148 assumes a high level to open the gate 146 and the switch 149 connects the resistor 151 to the pulse generator 141, which generates pulses of a frequency for moving base plate 55, for example, at a speed of 2 mm/s. When the moving base plate 55 is moved at this speed in the Y-axis direction in FIG. 10 and an output is derived from the gate 146 based on the count value of the counter 143, the optical fibers to be fused together next are brought to a position spaced from the center of the lase beam by a distance corresponding to the fiber diameter. At this time, the flip-flop 148 is inverted by the output from the gate 146, by which the gate 145 is opened and the counter 143 is reset and, further, the switch 149 is changed over to connect the resistor 152 to the pulse generator 141. At a consequence, the output pulse frequency of the pulse generator 141 is lowered and the moving base plate 55 is moved at a speed of 5 $\mu$m/s. In this state, when the optical fibers to be fused together are moved by a distance twice the fiber diameter, and decoder 144 having decoded the count value of the counter 143 applies its output to the gate 145 and the flip-flop 148 is inverted; as a result of this, the output $\overline{Q}$ of the flip-flop 148 assumes the high level to open the gate 146 and reset the counter 143. Further, the switch 149 is controlled to connect the resistor 151 to the pulse generator 141, raising its output pulse frequency. Thereafter, the abovesaid operations are repeated.

Figure 13:
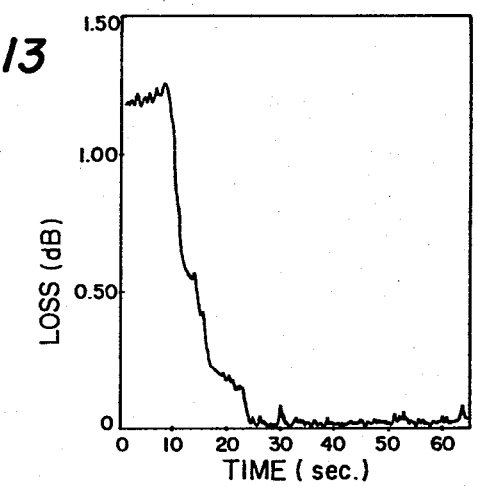
FIG. 13 is a graph showing loss variations during fusion-splicing.

In the above, the chips provided with the V-shaped grooves are employed as the fiber alignment holders, and such a fiber alignment method using V-shaped grooves has heretofore been used in the art. But, as one of the features of fusion-splicing by gradual heating and cooling of optical fibers using the laser beam, it can be mentioned that the accuracy of the V-shaped grooves is not so severe. This is due to the fiber axis misalignment correcting function by the surface tension of fused optical glass fibers. In the present invention the gradual heating ensures full utilization of this advantage. FIG. 13 shows how the fiber axis misalignment between two optical fibers to be fused together is corrected in the course of fusion-splicing to achieve low-loss splicing even in the case where the optical fibers are butted together with a fiber axis lateral misalignment of 5 to 10 $\mu$m therebetween and angular misalignment of 2° to 5° before fusion-splicing. In FIG. 13, the abscissa represents the lapse of time and the ordinate the splice loss. From FIG. 13 it is seen that a loss of about 1.2 dB due to the fiber axis lateral and angular misalignment before fusion-splicing, that is, a large loss as compared with a Fresnel loss of 0.3 dB in the case of the end faces of two optical fibers being butted together with no axis misalignments therebetween, is markedly reduced by fusion-splicing down to about 0.02 dB to correct the fiber axis misalignment.

Figure 14:
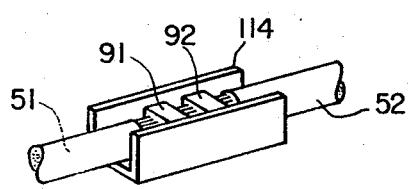
FIG. 14 is a perspective view illustrating an example of reinforcing means for a spliced part of an optical fiber cable.

Since the fusion splicing method of the present invention has such a feature, the accuracy of the V-shaped grooves of the fiber alignment chips need not be so severe and use can be made of fiber alignment chips formed of an inexpensive material such as fiber glass reinforced plastics commonly referred to as FRP. Accordingly, the alignment chips are disposable; hence, the spliced end portions of the optical fibers can be reinforced en bloc as they are. For example, as shown in FIG. 14, the interconnected optical fiber cables 51 and 52 with the alignment holders 91 and 92 mounted thereon are inserted into a reinforcing frame 114 having a U-shaped cross-section and, for example, an epoxy adhesive is filled in the reinforcing frame 114 to stick the alignment holders 91 and 92 to the frame 114 and, at the same time, the adhesive is filled in the space around the spliced points of the optical fibers between the alignment holders 91 and 92. In this way, the alignment holders 91 and 92 can also be used for reinforcing the spliced points of the optical fibers.

Figure 15:
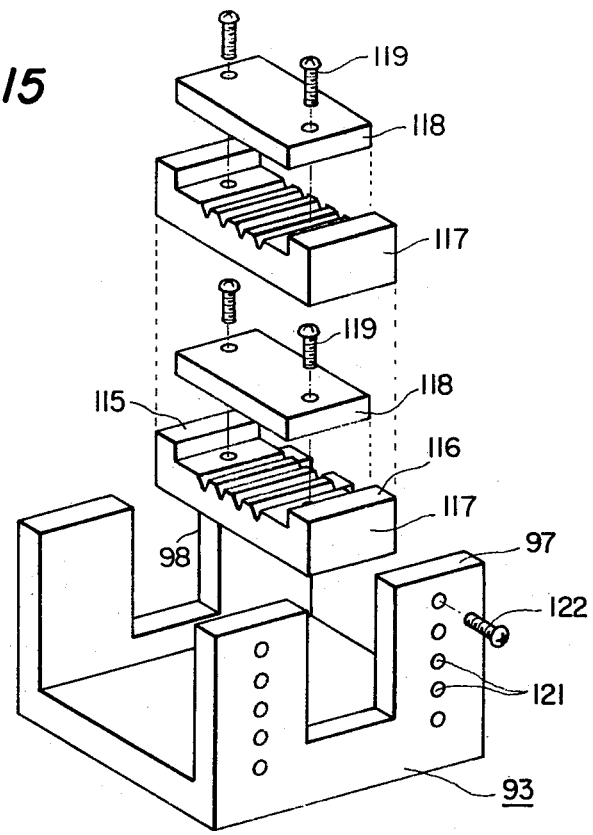
FIG. 15 is a perspective view illustrating an example of an alignment holder for aligning optical fibers for each layer.

The alignment holders 91 and 92 need not always be limited specifically to the abovesaid type but may also be other types. FIG. 15 shows a modified form of the alignment holder 92, which comprises an alignment chip 117 and a hold chip 118 for each optical fiber array. The alignment chip 117 has V-shaped grooves cut in its upper surface and projections 115 and 116 formed integrally therewith at its both ends to extend in parallel with the V-shaped grooves. Optical fibers (not shown) are each placed in one of the V-shaped grooves and the hold chip 118 is mounted on the alignment chip 117 between its projections 115 and 116 and then clamped by screws 119 to the alignment chip 117, thus forming one optical fiber array. Next, another alignment chip 117 is mounted on the abovesaid fiber array and optical fibers are respectively placed in the V-shaped grooves and then another hold chip 118 is fixed to the alignment chip 117 to provide another fiber array. In this way, optical fiber arrays are formed one by one. The fiber arrays are placed one on another in the alignment jig 93 and their positioning in the Y-axis direction is carried out between the positioning plates 97 and 98. Then, the hold chip 118 of the uppermost fiber layer is pressed towards the bottom of the alignment jig 93 and a pin 122 is inserted into a suitable one of small through holes 121 in the positioning plate 97 arranged in the Z-axis direction; namely, the hold chip 118 of the uppermost fiber layer is pressed by the projecting end of the pin 122. By this, the optical fibers are positioned in the Z-axis direction. The other alignment holder 91 is also formed to have the same construction as described above.

Figure 16:
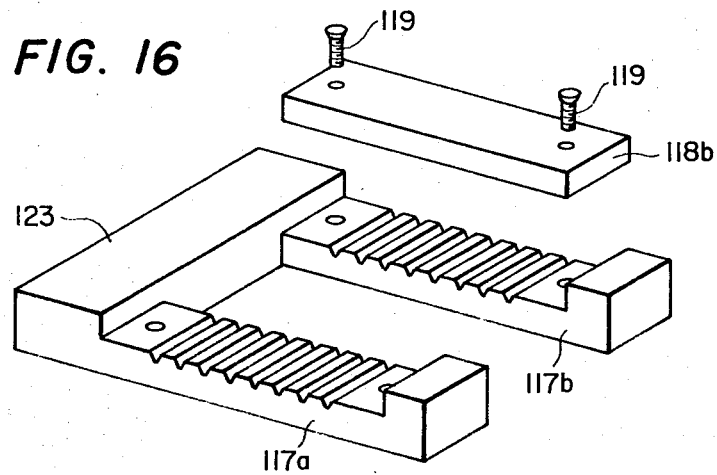
FIG. 16 is a perspective view showing an interlinked alignment holder.

The alignment chips of the alignment holders 91 and 92 may also be formed as a unitary structure. For example, as depicted in FIG. 16, alignment chips 117a and 117b of the alignment holders 91 and 92, which correspond to the alignment chip 117 shown in FIG. 15, are coupled together at one end through a coupling piece 123. The corresponding V-shaped grooves of the alignment chips 117a and 117b are formed in alignment. Optical fibers are placed in the V-shaped grooves of the alignment chips 117a and 117b and held by hold chips 118a (not shown) and 118b to form an array of optical fibers. A plurality of such alignment members, each forming an array of optical fibers of two optical fiber cables, are placed one on another in the alignment jig 93. In this case, since the alignment chips 117a and 117b are both fixed, fiber axis alignment is highly accurate. In the alignment jig 93, the fiber layers are positioned relative to one another in the Y-axis direction.

Since silica glass has a small thermal expansion coefficient of about $5 \times 10^{-7}/°C.$, there has heretofore been used a method in which butted fiber end faces are further pushed to each other during fusion-splicing. In the splicing equipment of the present invention, the optical fibers arranged in layers are not pushed one by one during fusion-splicing but instead, prior to fusion-splicing, the cable retainer 65 is moved towards the other cable retainer 64 to push the butted end faces of all the optical fibers of the both cables 51 and 52 against each other with a pressure. It has been confirmed that this also provides the same results as those obtainable in the case of pushing the optical fibers to each other one by one during fusion-splicing. Accordingly, splicing of the optical fibers arranged in many layers can easily be performed.

Table 1 shows, in comparison, average values of splice losses of twenty-four pairs of optical fibers in the cases of fusion-splicing the optical fibers merely held in light contact, the optical fibers once butted together and then pushed by 10 $\mu$m and the optical fibers once butted together and then pushed by 50 $\mu$m.

TABLE 1

| Relationships between splice loss and fiber pushed-in length | |
| --- | --- |
| Fiber pushed-in length | Average splice loss (dB) |
| 0 (fibers held in light contact) | 0.19 |
| 10 $\mu$m | 0.16 |
| 50 $\mu$m | 0.24 |

In the case where the optical fibers were pushed to each other by 10 $\mu$m after being butted together, the splice loss was minimum; this clearly indicates the effect of applying the butting pressure to the contact surface by pushing the optical fibers. In the case of 50 $\mu$m, the butting pressure is a little too large, which causes fiber axis misalignment between the butted fibers, resulting in increased splice loss.

Table 2 shows the relationships between the tensile strength of the fused optical fiber in the vicinity of the spliced point and the fiber pushed-in length.

TABLE 2

| Relationships between tensile strength of optical fiber in the vicinity of the spliced point and fiber pushed-in length | |
| --- | --- |
| Fiber pushed-in length | Average tensile strength (g) |
| 0 | 420 |
| 10 $\mu$m | 520 |
| 50 $\mu$m | 530 |

In the case where the optical fibers were merely held in light contact with each other, the average tensile strength was 420 g; but in the case where the optical fibers were pushed by 10 $\mu$m after being butted together, the tensile strength was markedly increased to 520 g.

From the above, it will be appreciated that it is preferred for optimum splicing that in the case of optical fibers arranged in a matrix form, the fibers be pushed together about 10 $\mu$m prior to fusion-splicing.

When used as the light source for fusion-splicing, the $CO_2$ laser is highly stable in power and wide in its power variable range. The power of the $CO_2$ laser employed in experiments can be varied continuously from 3 to 5 W, its stability is ±5% (long term); therefore, splicing of good reproducibility can be performed by an optimum power.

Figure 17:
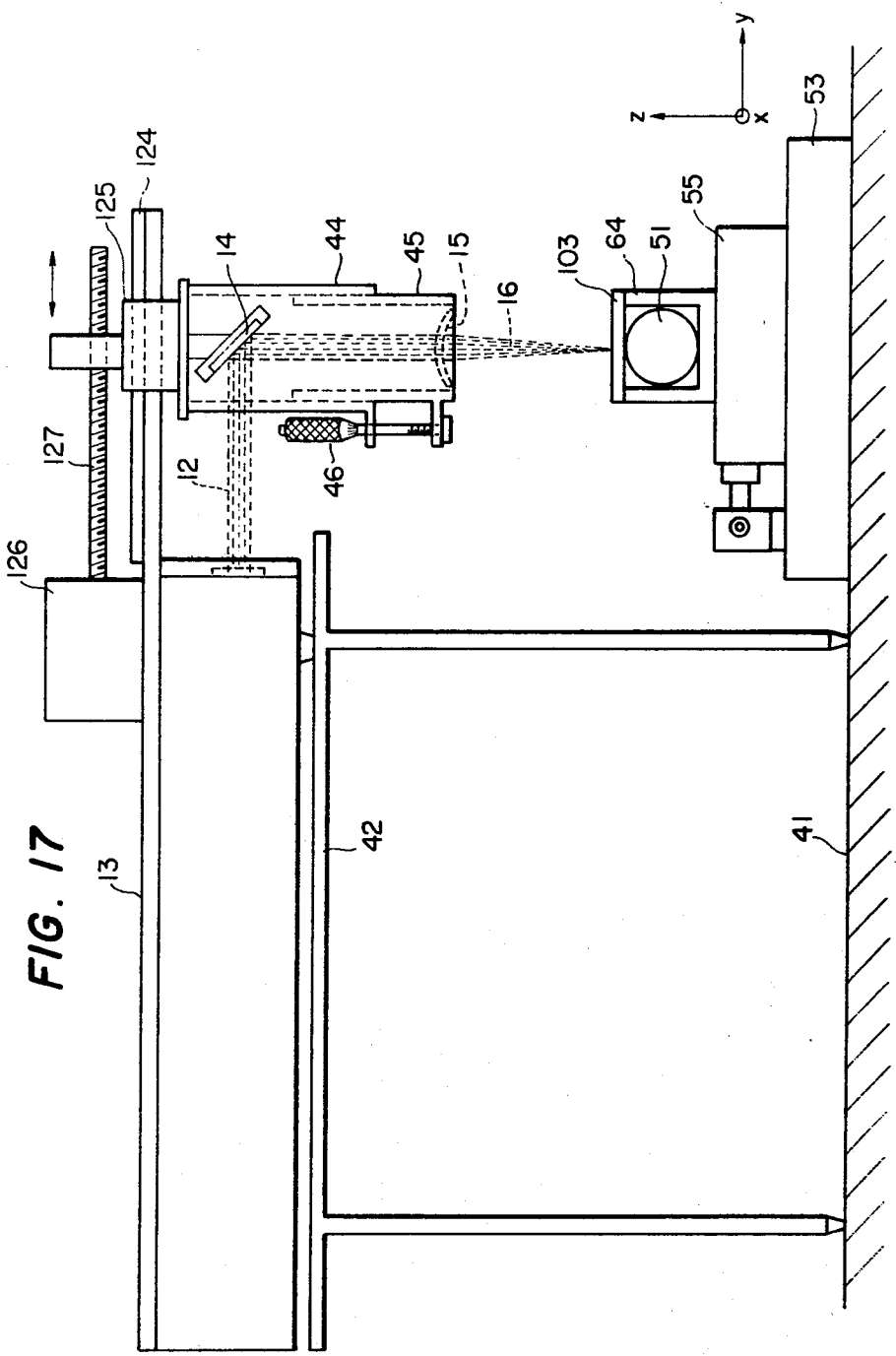
FIG. 17 is a front view of another example of the optical fiber splicing apparatus adapted for moving the optical system during fusion-splicing.

In the foregoing, the moving base plate 55 is moved in the Y-axis direction for sequentially fusion-splicing optical fibers of a selected one of the fiber layers of the cables 51 and 52, but instead of moving the base plate 55, the optical system may also be moved. For example, as illustrated in FIG. 17 in which parts corresponding to those in FIG. 10 are identified by the same reference numerals, the laser beam 12 from the laser source 13 is emitted in the Y-axis direction which is perpendicular to the axis of the optical fiber cables 51 and 52. A guide 124 projects out from the case of the laser source 13 in the direction of emission of the laser beam 12, and a support 125 on the top of the bodytube 44 is supported by the guide 124 in a manner to be movable thereon. On the case of the laser source 13 is mounted a motor 126, by which is driven a threaded shaft 127 provided adjacent and in parallel with the guide 124. The threaded shaft 127 is passed through one part of the bodytube support 125 and threadably engaged therewith. The reflector 14 for reflecting the laser beam 12 towards the optical fiber cables is held in the bodytube 44. By driving the threaded shaft 127, the bodytube 44 is moved in the Y-axis direction to direct the focused laser beam 16 to the optical fibers of a selected fiber layer for sequentially fusion splicing them. In short, the optical system and two groups of aligned optical fibers held by alignment holders are moved relative to each other so that the concentrated irradiation part of the focused beam, that is, its focused spot for fusion-splicing the optical fibers, may be moved two-dimensionally in the plane including the butted end faces of the optical fibers.

Figure 18:
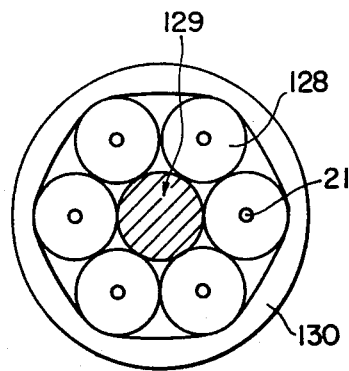
FIG. 18 is a cross-sectional view showing an example of an optical fiber cable.
Figure 19:
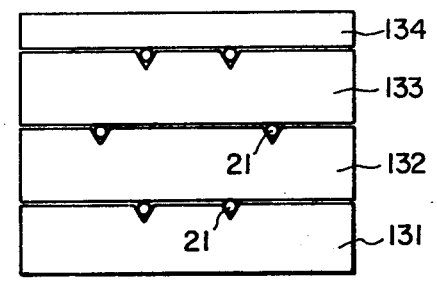
FIG. 19 is a cross-sectional view showing an example of an alignment holder suitable for use with the optical fiber cable of FIG. 18.

As the optical fiber cable, there is an optical fiber unit such, for example, as depicted in FIG. 18 in which six optical fibers 21, each given a plastic coating 128, are disposed symetrically about a tension member 129 and assembled together by a sheath 130. For fusion splicing of the optical fibers of such a cable, use is made of an alignment holder for holding the optical fibers 21 at their relative positions. An example of this alignment holder is shown in FIG. 19, which comprises alignment chips 131 to 134 and in which two V-shaped grooves are cut in each of the alignment chips 131 to 133. In this case, the V-shaped grooves are equally spaced apart in the alignment chips 131 and 133 but the spacing of the V-shaped grooves in the alignment chip 132 is larger than that in the other alignment chips. These alignment chips 131 to 133 are placed one on another in this order so that the V-shaped grooves respectively coincide with the optical fibers 21 arranged in FIG. 18. In this case, the focused beam spot diameter at the position of the optical fiber layers adjacent to the optical fibers to be fusion-spliced may be smaller than in the case of FIG. 1. This is because the power distribution in the light beam is a Gaussian distribution and because the optical fibers of adjoining layers are spaced laterally from the direction of the focused light beam. Also in the case of assembling together a plurality of such optical fiber cables as shown in FIG. 18 into one optical fiber cable, optical fibers can be spliced by the method and apparatus of this invention, using an alignment holder designed for such a particular cable structure. Also, the present invention is applicable to fusion splicing of groups of optical fibers which are not assembled together into optical fiber cables.

It is preferred that the optical fibers to be fused together are gradually heated and cooled, as described previously. In the foregoing, for this gradual heating and cooling, the optical fibers and the light source are moved relatively to each other so that the focused beam may move across the optical fibers at a constant speed within the aforementioned range. For gradual heating and cooling, it is also possible to control the light energy of the focused beam by intercepting one part of the light beam using a shutter such that the area of the intercepted portion of the beam gradually decreases and then increases, or by controlling the power for emitting the light beam instead of relative movement of the focused laser beam and optical fibers. Further, in the foregoing, the optical fiber layer to be exposed to focused beam irradiation is selected by moving the focusing optical system 15 and the holder 63 relative to each other in the Z-axis direction, and then optical fibers of the selected layer are sequentially fusion-spliced by continuously moving the optical system 15 and the holder 63 relative to each other in the Y-axis direction. In this case, it is also possible to select the optical fiber layer for light beam irradiation by the relative movement of the optical aystem 15 and the holder 63 in the Y-axis direction and sequentially fusion-splice the optical fibers of the selected layer by continuous relative movement of the optical system and the holder 63 in the Z-axis direction.

Next, a description will be given of experimental results of the present invention.

Single-layer Splicing

Figure 20:
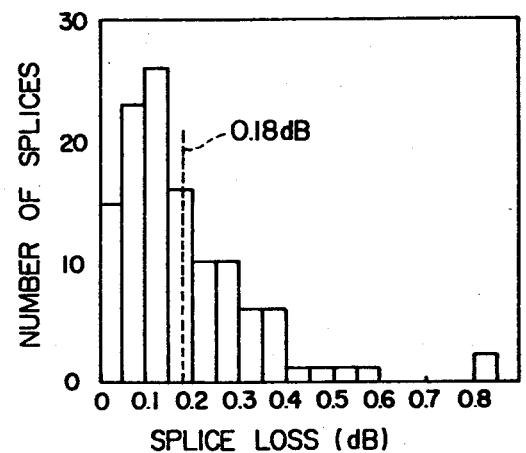
FIG. 20 is a histogram of splice loss.

The equipment shown in FIGS. 10 and 11 was employed according to the principles described previously in connection with FIG. 1. As the light source 13, a $CO_2$ laser was used and its output was 2.4 W at the position of optical fibers. As the focusing optical system 15, use was made of the aspheric lens described previously with regard to FIG. 6 and the minimum diameter of the focused light beam 16 was about 700 $\mu$m. Fusion-splicing of optical fibers was carried out after adjusting their position so that they might be brought to a position of a 800 $\mu$m beam diameter, a little apart from the beam focus, as shown in FIG. 7. The fiber moving speed was 15 $\mu$m/s by a 300 $\mu$m distance when the light beam was on the optical fibers for fusion-splicing, and 2 mm/s when the beam center was between the optical fibers. The optical fibers were arranged in three layers of an 8-fiber array, using the alignment holder shown in FIG. 15, and the layers were spaced 3 mm apart. The fusion-splicing of such twenty-four pairs of optical fibers was carried out five times; namely, one hundred and twenty pairs were spliced, and their splice losses were measured. A histogram of the measured splice losses is shown in FIG. 20, in which the abscissa represents splice loss and the ordinates the nunber of splices. The average splice loss was 0.18 dB, with a standard deviation of 0.16 dB. The average splice losses of the respective layers were 0.17 dB for the bottom layer, 0.21 dB for the intermediate layer and 0.15 db for the top layer. These values are a little larger than a 0.05 db splice loss obtainable with conventional single-fiber splicing, but do not practically present any serious problem. The splice loss of the intermediate layer is larger than the splice losses of the other layers; this is considered to be caused by the fact that the fiber axis misalignments are greater than the other layers' fibers. If the splice loss is increased by repeated passage of the little defocused light beam across the optical fiber even when they are not being spliced, then the splice loss of the uppermost layer ought to be the largest.

Table 3 shows experimental results as to whether or not the splice loss is increased by repeated irradiation on optical fibers by a focused light beam when the fibers are not being spliced. The splice loss value given in the table is the average loss of eight optical fibers of the same layer.

TABLE 3

Splice losses immediately after splicing and after repeated irradiation by a little defocused light beam after fusion-splicing

| Fusion-splicing run | Layer No. | | |
|---|---|---|---|
| | First layer (uppermost) | Second layer | Third layer |
| 1st run {Optical fibers of uppermost layer are fusion-spliced} | 0.15 dB | | |

TABLE 3-continued

Splice losses immediately after splicing and after repeated irradiation by a little defocused light beam after fusion-splicing

| Fusion-splicing run | Layer No. | | |
|---|---|---|---|
| | First layer (uppermost) | Second layer | Third layer |
| 2nd run (Optical fibers of second layer are fusion-spliced) | 0.16 dB* | 0.19 dB | |
| 3rd run (Optical fibers of third layer are fusion-spliced) | 0.14 dB* | 0.20 dB* | 0.18 dB |

*denotes the measured splice losses after repeated irradiation by a little defocused light beam.

Following the aforesaid procedures, optical fibers of the uppermost layer were fusion-spliced. The average splice loss at this time was 0.15 dB. Next, optical fibers of the second layer were fusion-spliced. During this fusion-splicing, the optical fibers of the first (uppermost) layer were exposed to the focused beam with a little enlarged spot size. The average splice loss of the fibers of the first layer measured again after the fusion-splicing of the second layer was 0.16 dB. The average splice loss of the eight optical fibers of the second layer was 0.19 dB. Then, optical fibers of the third layer were fusion-spliced and, also in this case, the fibers of the first and second layers were exposed to the focused beam with a little increased spot size. The average splice loss of the fibers of the third layer was 0.18 dB, and the average splice losses of the fibers of the first and second layers, measured again, were 0.14 dB and 0.20 dB respectively. These average splice losses assume substantially the same value within a measurement accuracy; therefore, it is not considered that the repeated irradiation of optical fibers by the little defocused light beam causes an increase in the splice loss. Accordingly, Table 3 indicates that the aforesaid conditions for focusing the light beam ensure that even if optical fibers arranged in layers are selectively fusion-spliced, the fibers other than that being fusion-spliced are not adversely affected. The average tensile strength of the spliced optical fibers was about 500 g, and the time needed for splicing the twenty-four pairs of fibers, measured from the removal of the plastic coating to the end of splicing was approximately 60 minutes.

Two-layer Splicing

The equipment of FIGS. 10 and 11 was used according to the principles described previously with respect to FIG. 3. The power of the $CO_2$ laser source 13 was 2.0 W. An aspheric lens was used to focus the light beam into a minimum spot diameter of about 720 $\mu$m. The alignment holder of FIG. 12 was used and the optical fiber layers were spaced 1 mm apart. The other conditions were the same as those in the case of the single-layer splicing described above. Since the beam diameter was a little too small, the average splice loss was 0.3 dB.

As has been described in the foregoing, according to the present invention, since the light beam is focused so that its diameter relatively rapidly increases when the beam goes away from the butted joint of optical fibers to be fused together, it is possible to fusion-splice the optical fibers arranged in many layers.

Since the optical fibers are gradually heated and cooled for splicing by moving the optical fibers and the focused light beam relative to each other, splices of low splice loss and good reproducibility can be obtained.

Optical fiber cables can be spliced without separating their fibers into individual ones and the spliced portions can be reinforced en bloc, therefore, high operation efficiency can be obtained. Since fusion-splicing, reinforcement of spliced optical fibers and treatment of their extra length can be achieved for each cable, the optical fibers can be prevented from bulking at their spliced portion. Further, since an increase in the splice loss of the fibers by the reinforcement of the fibers and the treatment of their extra length can be avoided, it is possible to achieve splicing which ensures to retain the smallness of the optical fiber and the low-loss characteristics of the fusion-splicing method.

Unlike the case of splicing with the use of adhesive, aging of the spliced point is small and the splice is highly reliable for long term use.

Furthermore, since the heat source used is clean, so foreign matter is fused together with butted fiber end faces; this also ensures high reliability of the splice.

It will be apparent that many modifications and variations may be effected without departing from the scope of the novel concepts of this invention.

What is claimed is:

1. An optical fiber splicing apparatus for splicing optical fibers in a bundle of optical fibers having first and second optical fiber groups, each composed of a plurality of optical fibers arranged in layers, comprising:
alignment mating means for holding the optical fibers of said first and second fiber groups in predetermined positions so that the axes of the corresponding pairs of individual fibers in each layer are parallel and the end faces thereof are butted together in alignment;
a light source disposed adjacent one side of said bundle for emitting a light beam from said side toward the optical fibers in said bundle to heat them;
a focusing optical system for focusing said light beam on at least one joint of the butted optical fibers in such a manner that the heating temperature of only the optical fibers on which the light beam is focused exceeds their melting point thereby to splice said optical fibers together; and
means for moving the focusing optical system and the alignment mating means relative to each other to shift the focal position of the light beam emitted from said one side of said bundle relative to said layers thereby to change the layer of said bundle in which fibers are being spliced.

2. An optical fiber splicing apparatus according to claim 1 wherein said relative movement of said optical system and alignment mating means occurs at a speed within the range of 10–25 $\mu$m/sec.

3. An optical fiber splicing apparatus according to claim 1 further comprising position adjusting means for adjusting the position of one of said first and second optical fiber groups held by said alignment mating means with respect to the other optical fiber group in the fiber-axis direction, said position adjusting means comprising a fiber retainer for retaining said one group of optical fibers for movement along the fiber axis, means for moving said fiber retainer towards said other group of optical fibers, and means for stopping the movement of said fiber retainer, said last-named means being adjustable in position to allow said fiber retainer to be moved through a predetermined distance which produces a predetermined abutting pressure between said first and second groups of fibers.

4. An optical fiber splicing apparatus according to claim 1 or 3 wherein the focusing optical system is designed so that the diameter of the light beam focused on the butted fibers is five to ten times the outer diameter of the optical fiber.

5. An optical fiber splicing apparatus according to claim 4, wherein the focusing optical system is designed so that the diameter of the light beam at the position of each of the butted fiber joints just above and below the butted fiber joint exposed to the focused light beam is more than 1.1 times the diameter of the light beam focused on the latter butted fiber joint.

6. An optical fiber splicing apparatus according to claim 1 or 3 wherein the focusing optical system includes an aspheric focusing lens of large aberration.

7. An optical fiber splicing apparatus according to claim 1 or 3 wherein the focusing optical system includes a conical lens.

8. An optical fiber splicing apparatus according to claim 1 or 3 wherein the focusing optical system comprises means for splitting the light beam into two portions, and first and second focal means for focusing the two portions and combining them into a composite light, the focused positions of the two focused portions being deviated from each other.

9. An optical fiber splicing apparatus according to claim 1 or 3 wherein the light source is a $CO_2$ gas laser.

10. An optical fiber splicing apparatus according to claim 1 or 3 wherein the relative moving means comprises first means for moving the focused light beam spot in a first direction substantially perpendicular to the fiber axis, and second means for moving the focused light beam spot in a second direction perpendicular to both said first direction of movement of the focused light beam spot and the fiber axis.

11. An optical fiber splicing apparatus according to claim 10, wherein the first means moves the focusing optical system in the direction of incidence of the light beam on the optical fibers.

12. An optical fiber splicing apparatus according to claim 10, wherein the second means moves the alignment mating means in a direction perpendicular to both the fiber axis and the light beam incident to the optical fibers.

13. An optical fiber splicing apparatus according to claim 10, wherein the second means comprises a reflector for reflecting the light beam from the light source for incidence to the focusing optical system, and means for moving the reflector in the direction of incidence of the light beam on said reflector.

14. An optical fiber splicing apparatus according to claim 1 or 3 wherein the focusing optical system is adapted to focus the light beam on two pairs of abutted optical fibers that are disposed adjacent one another in the direction of the focused light beam in such a manner that the diameter of the focused light beam becomes minimum midway between the two pairs of abutted fibers so that said two pairs are fusion-spliced simultaneously.

15. A method of splicing a first group of optical fibers to a second similar group of optical fibers, comprising the steps of aligning the end portions of said first and second groups of optical fibers so that the axes thereof are parallel and the endfaces thereof are in contact, forming a plurality of layers of aligned fibers, focusing a light beam on a butted joint of optical fibers in a selected one of said layers to heat only the fibers in said butted joint to a temperature in excess of the melting point of said fibers so that the endfaces of the optical fibers at said joint are fused together, effecting first relative movement between said light beam and the optical fibers in a direction perpendicular to the axes of the fibers without changing the focal length of said light beam to cause the pairs of abutted optical fibers in only said selected layer to be spliced in succession, changing the focal length of said light source in a second direction perpendicular to the direction of said first relative movement to change the effective focal position of said light beam relative to said layers, and thereafter repeating said first relative movement between said light beam and said fibers to cause the fibers in a layer which is behind the fibers of said selected layer to be spliced together in succession.

16. A method of splicing a first group of optical fibers to a second similar group of optical fibers, comprising the steps of aligning the end portions of said first and second groups of optical fibers so that the axes thereof are parallel and the endfaces thereof are in contact, forming a plurality of layers of said aligned fibers, focusing a light beam on said layers in such a manner that the beam focal point lies midway between the abutted end faces of fiber pairs in two adjacent ones of said layers to heat said abutted end faces in said two layers above their melting points simultaneously so that said two abutted fiber pairs are fusion-spliced simultaneously, effecting first relative movement between said light beam and said fibers in a direction perpendicular to the axes of the fibers without changing the focal length of said light beam so that successive pairs of abutted fiber pairs in said two adjacent layers are fusion-spliced in succession, changing the focal length of said light source in a second direction perpendicular to the direction of said first relative movement to shift the effective focal position of said light beam relative to said layers so that said light beam focuses at a position between two different adjacent layers of said aligned fibers, and thereafter repeating said first relative movement between said light beam and said fibers to splice together the fibers in said two different adjacent layers.

17. A method according to claim 15 or 16 wherein the contacting endfaces of said pairs of abutted optical fibers are all pushed against one another with a slight butting pressure during the fusion splicing of said fibers.

* * * * *